United States Patent
Ou et al.

(10) Patent No.: US 11,438,067 B2
(45) Date of Patent: Sep. 6, 2022

(54) DIGITAL OPTICAL FIBER-BASED DISTRIBUTED SIGNAL CONTROL SYSTEM

(71) Applicant: ZHEJIANG SUNWAVE COMMUNICATIONS TECHNOLOGY CO., LTD, Hangzhou (CN)

(72) Inventors: Xingbao Ou, Hangzhou (CN); Yongfu Cao, Hangzhou (CN); Jianfeng Yang, Hangzhou (CN); Yongchao Yuan, Hangzhou (CN)

(73) Assignee: ZHEJIANG SUNWAVE COMMUNICATIONS TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 17/270,033

(22) PCT Filed: Dec. 28, 2018

(86) PCT No.: PCT/CN2018/124741
§ 371 (c)(1),
(2) Date: Feb. 21, 2021

(87) PCT Pub. No.: WO2020/037928
PCT Pub. Date: Feb. 27, 2020

(65) Prior Publication Data
US 2021/0328672 A1    Oct. 21, 2021

(30) Foreign Application Priority Data
Aug. 24, 2018 (CN) .................... 201810973130.1

(51) Int. Cl.
*H04B 10/2575* (2013.01)
*H04W 4/029* (2018.01)
*H04W 8/00* (2009.01)

(52) U.S. Cl.
CPC . *H04B 10/25758* (2013.01); *H04B 10/25753* (2013.01); *H04W 4/029* (2018.02); *H04W 8/005* (2013.01)

(58) Field of Classification Search
None
See application file for complete search history.

(56) References Cited

U.S. PATENT DOCUMENTS 9,673,904 B2 * 6/2017 Palanisamy ........ H04B 10/0795
10,128,951 B2 * 11/2018 Casterline ........ H04B 10/25756
(Continued)

FOREIGN PATENT DOCUMENTS

| CN | 1426257 A | 6/2003 |
|---|---|---|
| CN | 101754431 A | 6/2010 |

(Continued)

OTHER PUBLICATIONS

The extended European search report of 18931136.8.
ISR of PCT/CN2018/124741.

*Primary Examiner* — Li Liu

(57) ABSTRACT

The present invention provides a digital optical fiber-based distributed signal control system. The system mainly comprises a wireless signal access control module, a detection module, and a private network module. By means of reasonable frequency allocation and pre-selection filtering processing, modules can work together to implement control and detection of unauthorized mobile phone signals and guarantee communications of legal mobile phones, thereby achieving efficient coverage of a signal control area. A main control signal generated by a main control signal unit (SU) and an auxiliary control signal generated by a remote unit (RU) are mixed according to an algorithm, to achieve a better control effect in the entire signal control area.

8 Claims, 3 Drawing Sheets

(56) References Cited

U.S. PATENT DOCUMENTS

| 2003/0109246 | A1* | 6/2003 | Shimizu | H04M 1/72463 |
| | | | | 455/411 |
| 2011/0310941 | A1* | 12/2011 | Kenington | H04W 88/085 |
| | | | | 375/220 |
| 2017/0094519 | A1* | 3/2017 | Salyers | H04W 52/244 |

FOREIGN PATENT DOCUMENTS

| CN | 203387508 U | 1/2014 |
| CN | 107332639 A | 11/2017 |

* cited by examiner

DIGITAL OPTICAL FIBER-BASED DISTRIBUTED SIGNAL CONTROL SYSTEM

CROSS-REFERENCE TO RELATED APPLICATIONS

This application is a 371 of international PCT patent application PCT/CN2018/124741 filed on Dec. 28, 2018, which claims all benefits accruing from China Patent Application No. 201810973130.1, filed on Aug. 24, 2018, in the China National Intellectual Property Administration, the content of which is hereby incorporated by reference.

TECHNICAL FIELD

The present disclosure generally relates to the technical field of control transmitting mobile communication signal, and in particular, to a digital optical fiber-based distributed signal control system.

BACKGROUND

Currently, complete coverage of mobile communications has been basically achieved, however, for some regulatory areas, such as examination hall, school, conference center, interception, and important military area, etc. It is necessary to prohibit mobile phones of persons from generating communication services, and also ensure normal communication for workers in the regulatory areas. However, in practice, there are inevitable cases where external mobile phones enter prohibited areas through various means and approaches, and therefore in this case, it is also required to be able to identify, discover and locate these external mobile phones in time and obtain identity information of the external mobile phones.

In order to achieve the described requirements, a detecting base station is usually used to interface unauthorized mobile phones, and a private network base station is set up to provide private network communication for authorized users. However, there are several difficulties in practical implementation: 1. a current mobile communication system has the following features: more frequency bands (currently there are up to 8 frequency bands in China, the number of frequency bands in each country and region will vary), more standards (GSM, CDMA, WCDMA, TD-SCDMA, FDD-LTE, TD-LTE), more operators, more base station cells and more mobile phone models. If the whole network control (detecting) needs to be achieved, a large number of detecting base stations are required, because the detecting base stations need to be arranged according to a frequency band, a standard and an operator respectively, otherwise, the unauthorized mobile phones can obtain communication (the detecting base station will also interfere with nearby users outside the signal control area). Certain mobile phones also have a function of anti detecting base stations, and therefore the construction cost of the detecting base station systems is very high. 2. Another difficulty lies in that, on the premise of implementing detecting, it is also necessary to combine signal access control, and common signal access control system is further divided into various technologies: scanning interference type, white noise interference type. It has not been mentioned in patents that how these signal access control methods coexist well with detecting and private network, i.e., to implement signal access control and detecting of unauthorized mobile phones, and to implement communication of authorized users. 3. In general, patents about signal access control are merely valid for a single device, and for a case where area control is required, more devices need to be used, and it has not been mentioned in patents that how these devices can implement signal access control efficiently.

SUMMARY

The purpose of the present disclosure is to overcome the shortcomings of the related art and provide a digital optical fiber-based distributed signal control system for the convenience of users that not only controlling the operator's public network signal, but also having a function of private network, detecting and positioning. This system can effectively reduce a burden of network construction for users and achieve a larger range of efficient coverage through a remote form of digital optical fiber.

The purpose of the present disclosure is achieved by the following technical solution.

A digital optical fiber-based distributed signal control system mainly includes a wireless signal access control module, a detection module and a private network module, the wireless signal access control module mainly including a receiving antenna, a main control signal unit SU, a converged access unit AU, a remote unit RU, and a transmitting antenna connected in sequence.

The receiving antenna is configured to receive a base station signal in the air from a base station.

The main control signal unit SU is configured to obtain the base station signal through a coaxial port, and obtain a baseband control signal corresponding to a communication signal at a frequency band after the base station signal is processed, wherein the baseband control signal after being encoded is transmitted through a digital optical fiber to the converged access unit AU as a main control signal, and the digital optical fiber is an optical fiber configured to transmit a digital signal.

The converged access unit AU is configured to transmit the main control signal from the main control signal unit SU, a detecting signal from the detection module and a private network signal from the private network module to the remote unit RU through the digital optical fiber.

The remote unit RU is configured to generate an auxiliary control signal according to a signal intensity of signal in an access control area and base station information, mix the generated auxiliary control signal with the main control signal from the converged access unit AU according to an algorithm to generate a preliminary control signal, filter out a signal with a frequency corresponding to the detecting signal and a signal with a frequency corresponding to the private network signal from the preliminary control signal to generate a comprehensive control signal through pre-selection filtering, and finally combine the comprehensive control signal with the detecting signal and the private network signal to generate a comprehensive management signal.

The transmitting antenna is configured to transmit the comprehensive management signal from the remote unit RU to the air to control transmitting a signal from the base station to a mobile phone.

The detection module may include at least one detecting base station configured to detect an unauthorized mobile phone.

The private network module may include a private network base station configured to provide private network communication for authorized users.

The at least one detecting base station and the private network base station are configured to establish an uplink and downlink connection through the converged access unit AU, and the remote unit RU in the wireless signal access control module is also configured to serve as a forwarding relay for the detecting signal and the private network signal.

(Cancelled)

(Cancelled)

(Cancelled)

(Cancelled)

The present disclosure can be further defined and refined by the following technical solutions.

As a technical solution, the main control signal is denoted by P, the auxiliary control signal is denoted by S, and the preliminary control signal is denoted by J. P and S are mixed according to the algorithm to generate J, $J=\alpha \times P+(1-\alpha) \times S$, wherein $0<\alpha<1$, when $\alpha$ is greater than 1, J=P, and $\alpha$ is the ratio of a radius of a region actually covered by the remote unit RU to a distance between the remote unit RU and the main control signal unit SU.

The main control signal generated by the main control signal unit SU and the auxiliary control signal generated by the remote unit RU can be mixed by the described algorithm, so that a better access control effect can be achieved in the whole control area by mixing. The experimental results indicate that when the comprehensive control signal is greater than the operator signal by 3 dB to 5 dB, the coverage effect with approximately 95% or more can be achieved, and when the comprehensive control signal is greater than the operator signal by 10 dB, the coverage effect with 100% can be achieved.

As a technical solution, the signals of the detection module, the private network module and the wireless signal access control module have different frequencies. In order to detect an unauthorized mobile phone in the access control area and provide communication for mobile phones of authorized users, the wireless signal access control module needs to work in cooperation with the detection module and the private network module. The cooperation principle is the fact that in order to avoid an interference of the control signal on the detecting signal or an interference of the control signal on the private network signal, the comprehensive control signal, the detecting signal and the private network signal need have different frequency. Specifically, the remote unit RU may mix the generated auxiliary control signal with the main control signal from the converged access unit AU according to the algorithm to generate a preliminary control signal, filter out a signal with a frequency corresponding to the detecting signal and a signal with a frequency corresponding to the private network signal from the preliminary control signal to generate a comprehensive control signal through pre-selection filtering, and finally combine the comprehensive control signal with the detecting signal and the private network signal to generate a comprehensive management signal. For the uplink, since there is no access control signal transmission, no interference will be caused to the detecting signal or the private network signal, and thus no special processing can be performed. It should be noted that, for the downlink, stray leakage of the comprehensive management signal of the downlink at the uplink frequency needs to be controlled.

As a technical solution, at least one remote unit RU is connected to the converged access unit AU through the digital optical fiber, and each remote unit RU is connected to one or more transmitting antennas through a coaxial cable. A plurality of remote units RUs are synchronously transmitting signals by control cooperation of the converged access unit AU to achieve a larger access control area. One or more transmitting antennas are provided for each of the plurality of remote units RUs to enlarge the access control area, a coverage of which can be extended from 10-200 meters to several kilometers required by the user.

As a technical solution, the distributed signal control system may further include an extension unit EU connected to the converged access unit AU and the remote unit RU respectively through the digital optical fiber, and the extension unit EU may act as an extension access to increase the number of ports of the remote unit RU. Similarly, adding the number of the remote unit RU may achieve a larger range of controlling.

As a technical solution, the converged access unit AU is connected to the private network base station and a plurality of detecting base stations, respectively, and the number of detecting base stations is in line with the number of local mobile operators. Specifically, the corresponding number of detecting base stations can be set according to the number of mobile operators in different countries. Take China as an example, since there are three main mobile operators in China, including Mobile, Unicom and Telecom, a detecting base station can be set up for each mobile operator separately to reside unauthorized mobile phones from each mobile operator.

As another technical solution, the distributed signal control system may further include a positioning module configured to obtain a position information of a target mobile phone, and the positioning module is connected to the detection module and the converged access unit AU respectively, detecting an intensity of an uplink signal of the target mobile phone in the positioning module by match filtering according to an uplink signal characteristic of the target mobile phone, wherein a location of the target mobile phone is determined by identifying the positioning module with the strongest signal strength among uplink signals.

The present disclosure can also obtain a larger control range by cooperating with a plurality of control system, and the specific technical solutions are as follows.

As a technical solution, the digital optical fiber-based distributed signal control system may include at least one control system, and the main control signal unit SU in each control system is further connected to a GPS antenna to obtain synchronous GPS clock information and use a second flip time of the GPS as a common clock to realize synchronization among a plurality of control systems.

In summary, the present disclosure may include a wireless signal access control module, a detection module, a private network module and a positioning module, which enable each module to work cooperatively by means of reasonable frequency allocation and pre-selected filter processing, thereby implementing signal control, detecting and ensuring communication of an unauthorized mobile phone, and achieving efficient coverage of a signal control area. In addition, the main control signal generated by the main control signal unit SU and the auxiliary control signal generated by the remote unit RU are mixed according to the algorithm, so that a better signal control effect can be achieved in the whole signal control area, and the experimental results indicate that when the comprehensive management signal is greater than the operator signal by 3 dB to 5 dB, the coverage effect with approximately 95% or more can be achieved, and when the comprehensive control signal is greater than the operator signal by 10 dB, the coverage effect with 100% can be achieved. While achieving the overall control target, the cost of the system is greatly reduced. In addition, in order to achieve a larger range of control signal coverage, GPS synchronization can be employed to make a plurality of sets of same control system work cooperatively, so as to achieve distributed coverage at kilometers level.

DETAILED DESCRIPTION OF THE EMBODIMENTS

The present disclosure will be described in detail below with reference to the drawings and specific embodiments, and the present disclosure is related to CN 103607254B.

A First Embodiment

Figure 1:
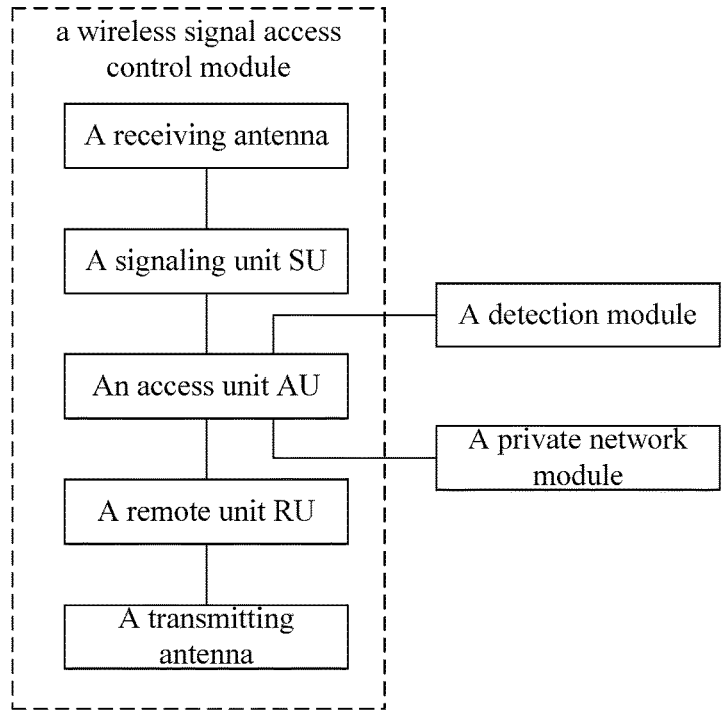
FIG. 1 is a schematic diagram according to a first embodiment.

As shown in FIG. 1, the present disclosure discloses a digital optical fiber-based distributed signal control system, mainly including a wireless signal access control module, a detection module and a private network module. The wireless signal access control module may mainly include a receiving antenna, a main control signal unit SU, a converged access unit AU, a remote unit RU, and a transmitting antenna which are connected in sequence.

The receiving antenna receives a base station signal in the air from a base station.

The main control signal unit SU obtains the base station signal through a coaxial port, and obtains a baseband control signal corresponding to a communication signal at a frequency band after the base station signal is processed, wherein the baseband control signal after being encoded is transmitted through a digital optical fiber to the converged access unit AU as a main control signal. The digital optical fiber is an optical fiber configured to transmit a digital signal.

The converged access unit AU transmits the main control signal from the main control signal unit SU, a detecting signal from the detection module and a private network signal from the private network module to the remote unit RU through the digital optical fiber.

The remote unit RU generates an auxiliary control signal according to a signal intensity of signal in an access control area and base station information, mix the generated auxiliary control signal with the main control signal from the converged access unit AU according to an algorithm to generate a preliminary control signal, filter out a signal with a frequency corresponding to the detecting signal and a signal with a frequency corresponding to the private network signal from the preliminary control signal to generate a comprehensive control signal through pre-selection filtering, and finally combine the comprehensive control signal with the detection signal and the private network signal to generate a comprehensive management signal.

The transmitting antenna transmits the comprehensive management signal from the remote unit RU to the air to control transmitting a signal from the base station to a mobile phone.

The detection module may include at least one detecting base station configured to detect an unauthorized mobile phone.

The private network module may include a private network base station configured to provide private network communication for authorized users.

The at least one detecting base station and the private network base station can establish an uplink and downlink connection through the converged access unit AU, and the remote unit RU in the wireless signal access control module also serves as a forwarding relay for the detecting signal and the private network signal.

In the present disclosure, the original design of the transmitting and receiving antennas in one in the original patented technology is changed, and the receiving antenna is separated from the transmitting antenna. In addition to the fact that the antenna is connected to the main control signal unit SU and the remote unit RU respectively through a coaxial cable, digital optical fiber connections are adopted between the main control signal unit SU and the converged access unit AU, and between the converged access unit AU and the remote unit RU or the like. The access control, detecting and private network functions of the present disclosure are integrated, and the principles of various functions are introduced below in combination with the present system.

1. The principle of the wireless signal access control module is described here: a base station signal in the air from a receiving antenna port enters each frequency band filter of the main control signal unit SU through a coaxial cable. The signal after filtering is amplified through a low-noise amplifier, after which the signal is converted by a down-converter. The converter output is digitized by an ADC and then enters a FPGA for software radio processing, filtering and storage and forwarding algorithm processing, etc., to obtain a baseband control signal corresponding to a communication signal at a frequency band. The baseband control signal is transmitted to the converged access unit AU as a main control signal through the digital fiber. The converged access unit AU transmits the main control signal from the main control signal unit SU, the detecting signal from the detection module and the private network signal from the private network module to the remote unit RU through the digital fiber. The remote unit RU generates the auxiliary control signal according to the signal intensity of signal in the access control area and the base station information, mix the generated auxiliary control signal with the main control signal from the converged access unit AU according to the algorithm to generate a preliminary control signal, filter out a signal with a frequency corresponding to the detecting signal and a signal with a frequency corresponding to the private network signal from the preliminary control signal to generate a comprehensive control signal through pre-selection filtering, and finally combine the comprehensive control signal with the detecting signal and the private network signal to generate a comprehensive management signal. The comprehensive management signal is fed into the transmitting antenna after being amplified through a power amplifier and transmitted to the air to control the signal from the base station to the mobile phone. The remote unit RU generates the auxiliary control signal in a similar way as the signaling unit SU generates the main control signal. The closer the remote unit RU is to the signaling unit SU, the higher the percentage of the main control signal is when the preliminary control signal is generated.

If the main control signal is denoted by P, the auxiliary control signal is denoted by S, and the preliminary control signal is denoted by J. P and S are mixed according to the algorithm to generate J, $J=\alpha \times P+(1-\alpha) \times S$, wherein $0<\alpha<1$, when $\alpha$ is greater than 1, J=P, and $\alpha$ is the ratio of a radius of a region actually covered by the remote unit RU to the distance between the remote unit RU and the main control signal unit SU. When the distance is greater than the radius, a can reflect the proximity of the remote unit RU to the location of the receiving antenna of the signaling unit SU, and the closer a distance between the remote unit RU and the signaling unit SU, the closer $\alpha$ is to 1. The main control signal generated by the main control signal unit SU and the auxiliary control signal generated by the remote unit RU can be mixed by the described algorithm, so that a better access control effect can be achieved in the whole control area by mixing. The experimental results indicate that when the comprehensive control signal is greater than the operator signal by 3 dB to 5 dB, the coverage effect with approximately 95% or more can be achieved, and when the comprehensive control signal is greater than the operator signal by 10 dB, the coverage effect with 100% can be achieved.

2. The principle of detecting communication is described here: the detection module includes at least one detecting base station configured to detect an IMSI of a mobile phone, if the IMSI is not on the white list according to a preset white list, the corresponding mobile phone is judged into a black list, i.e. an unauthorized mobile phone, and the detecting base station resides the behavior of the unauthorized mobile phone and sends signaling to the mobile phone in the white list to enable the mobile phone in the white list to jump to the private network base station. The at least one detecting base station may establish an uplink and downlink connection to the wireless signal access control module through the converged access unit AU, and the remote unit RU in the wireless signal access control module also serves as a forwarding relay for the detecting signal. When implementing the detecting function, the downlink is the fact that the signal from one or more detecting base stations is digitized for software radio processing by the converged access unit AU, then the digital signal may reach the remote unit RU through the digital optical fiber to be restore to a radio frequency carrier signal (namely, a detecting signal part in the comprehensive management signal) by the remote unit RU, and the radio frequency carrier signal is transmitted to the access control area through the transmitting antenna for communicating with the mobile phone in the access control area. In this case, the wireless signal access control module controls signals of all public networks during operation, but no control is performed on the detecting base station and the private network. The signal direction of the uplink is reversed and the unauthorized mobile phone is accessed to the detecting base station.

3. The principle of private network communication is described here: the private network base station is configured to provide private network communication for authorized users, and establish an uplink and downlink connection to the wireless signal access control module through the converged access unit AU. The remote unit RU in the wireless signal access control module also serves as a forwarding relay for the private network signal. The downlink signal of the private network base station is digitized for software radio processing by the converged access unit AU, then the digital signal may reach the remote unit RU through the digital optical fiber to be restore to a radio frequency carrier signal (namely, a private network signal part in the comprehensive management signal) by the remote unit RU, and the radio frequency carrier signal is transmitted to the access control area through the transmitting antenna for mobile phone of authorized users, and the signal direction of the uplink is reversed. The coverage of the radio frequency signal of the private network is configured to generate a private network to connect to a private network mobile phone in the access control area, and the connection may need to be authenticated by a private network SIM card, and the private network is not accessible to non-specific mobile phones.

In order to detect an unauthorized mobile phone in the access control area and provide communication for mobile phones of authorized users, the wireless signal access control module needs to work in cooperation with the detection module and the private network module. The cooperation principle is the fact that in order to avoid an interference of the control signal on the detecting signal or an interference of the control signal on the private network signal, the comprehensive control signal, the detecting signal and the private network signal need have different frequencies. The frequency ranges of the private network base station and the detecting base station are different from the frequency ranges of the access control respectively and have no overlaps with the frequency ranges of the access control. Specifically, the remote unit RU may mix the generated auxiliary control signal with the main control signal from the converged access unit AU according to the algorithm to generate a preliminary control signal, filter out a signal with a frequency corresponding to the detecting signal and a signal with a frequency corresponding to the private network signal from the preliminary control signal to generate a comprehensive control signal through pre-selection filtering, and finally combine the comprehensive control signal with the detecting signal and the private network signal to generate a comprehensive management signal. For the uplink, since there is no access control signal transmission, no interference will be caused to the detecting signal or the private network signal, and thus no special processing can be performed. It should be noted that, for the downlink, stray leakage of the comprehensive management signal of the downlink at the uplink frequency needs to be controlled.

A Second Embodiment

Figure 2:
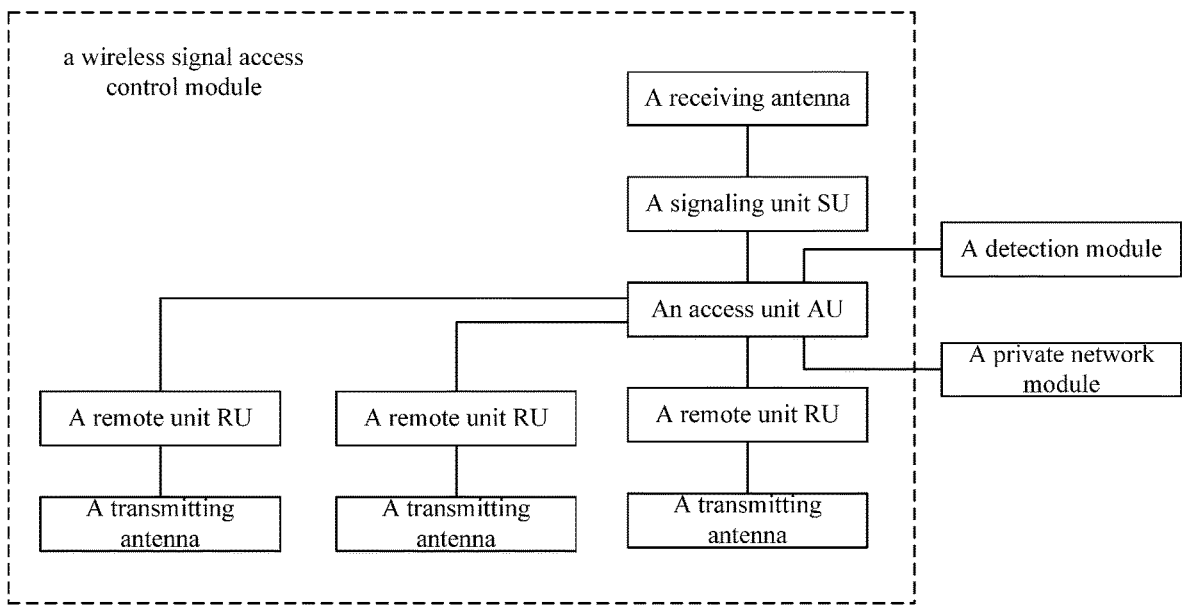
FIG. 2 is a schematic diagram according to a second embodiment.

As shown in FIG. 2, unlike the first embodiment, a plurality of remote units RUs are connected to the converged access unit AU through the digital optical fiber and each remote unit RU is connected to a transmitting antenna through a coaxial cable. A plurality of remote units RUs are synchronously transmitting signals by control cooperation of the converged access unit AU to achieve a larger access control area, a coverage of which can be extended from 10-200 meters to several kilometers required by the user.

A Third Embodiment

Figure 3:
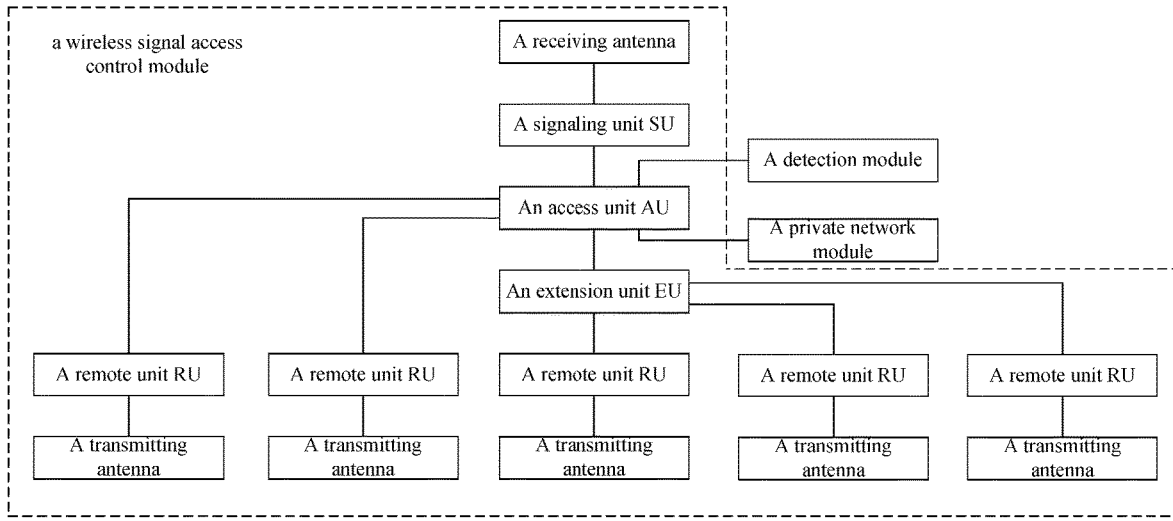
FIG. 3 is a schematic diagram according to a third embodiment.

As shown in FIG. 3, unlike the second embodiment, the distributed signal control system may further include an extension unit EU connected to the converged access unit AU and the remote unit RU respectively through the digital optical fiber, and the extension unit EU may act as an extension access to increase the number of ports of the remote unit RU. As mentioned above, adding the number of the remote unit RU may achieve a larger range of control.

A Fourth Embodiment

Figure 4:
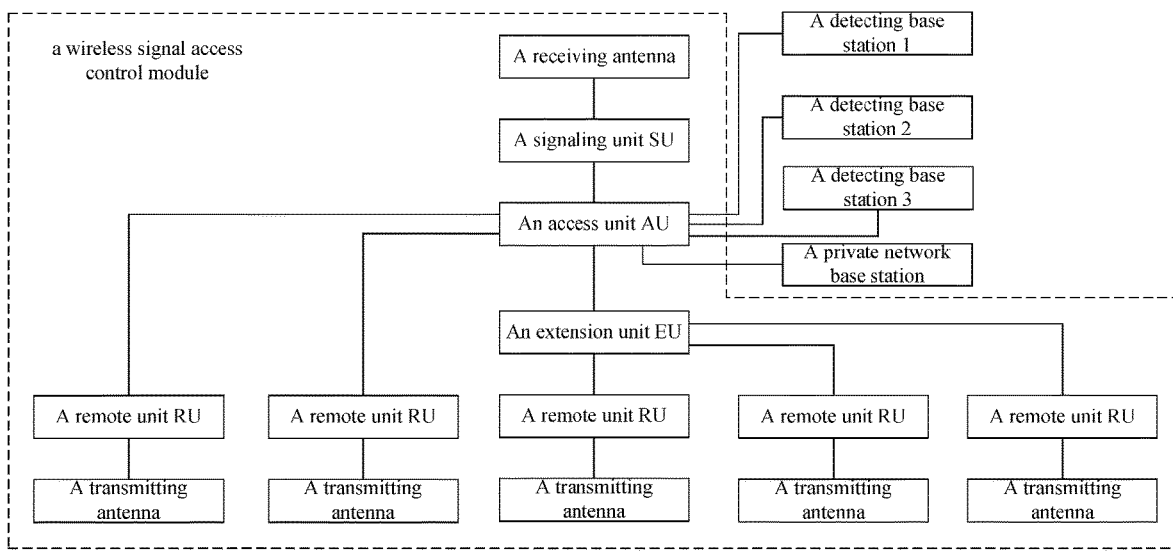
FIG. 4 is a schematic diagram according to a fourth embodiment.

As shown in FIG. 4, based on the third embodiment, the converged access unit AU can be connected to a private base station and a plurality of detecting base stations respectively. Specifically, the corresponding number of detecting base stations can be set according to the number of mobile operators in different countries. Take China as an example, since there are three main mobile operators in China, including Mobile, Unicom and Telecom, a detecting base station can be set up for each mobile operator separately to reside unauthorized mobile phones from each mobile operator.

A Fifth Embodiment

Figure 5:
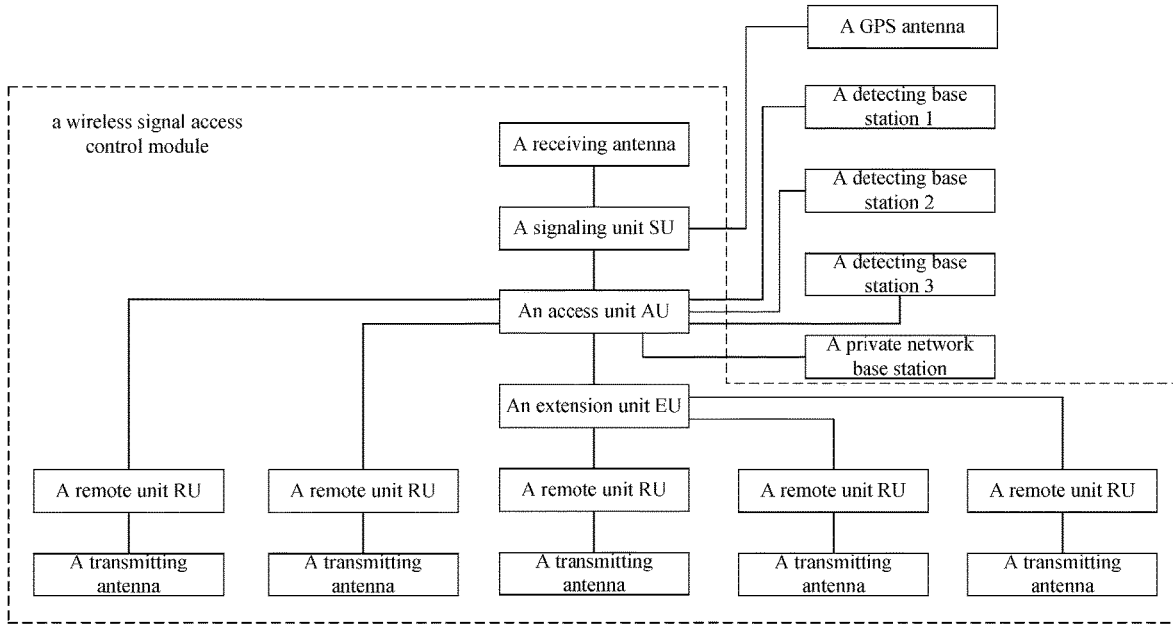
FIG. 5 is a schematic diagram according to a fifth embodiment.

As shown in FIG. 5, unlike the fourth embodiment, the present disclosure can cooperate with a plurality of control system. FIG. 5 provides a schematic diagram of any one of the control systems. Specifically, the main control signal unit SU in the control system is further connected to a GPS antenna to obtain synchronous GPS clock information and use a second flip time of the GPS as a common clock to realize synchronization among the plurality of control systems. By using common clock synchronization among the plurality of control systems, the coverage area can be effectively expanded, and distributed coverage at kilometers level can be realized.

A Sixth Embodiment

Figure 6:
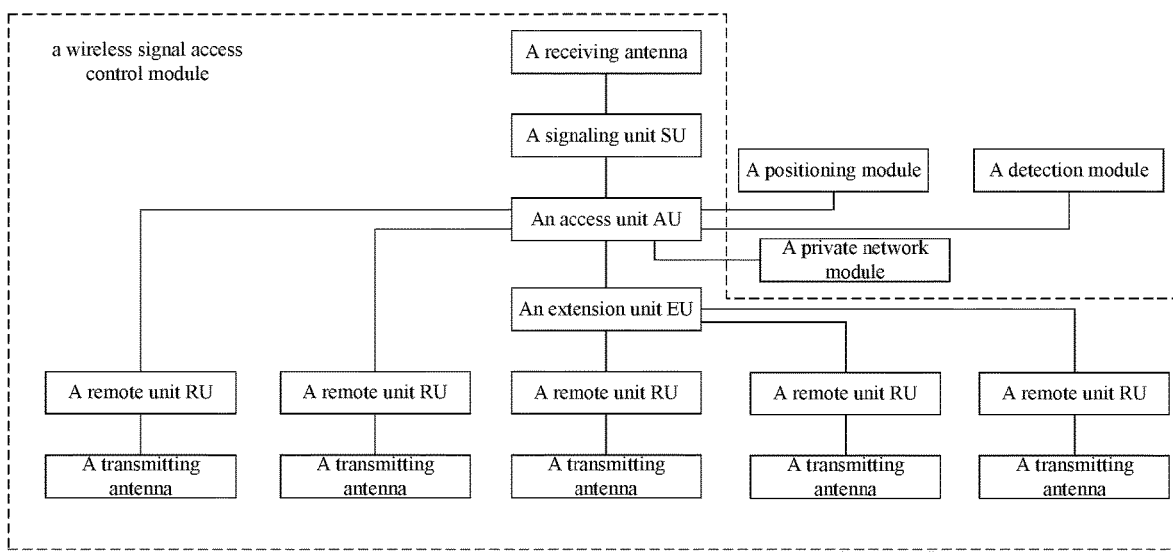
FIG. 6 is a schematic diagram according to a sixth embodiment.

As shown in FIG. 6, unlike the third embodiment, the present disclosure may further include a positioning module configured to obtain position information of a target mobile phone, and the positioning module is connected to the detection module and the converged access unit AU respectively, detecting an intensity of an uplink signal of the target mobile phone in the positioning module by match filtering according to an uplink signal characteristic of the target mobile phone, wherein a location of the target mobile phone is determined by identifying the positioning module with the strongest signal strength among uplink signals.

It is understood that to a person skilled in the art, equivalent substitutions or changes to the technical solutions and inventive ideas of the present disclosure shall fall within the scope of protection of the claims appended to the present disclosure.

We claim:

1. A digital optical fiber-based distributed signal control system, wherein the system mainly comprises a wireless signal access control module, a detection module and a private network module, the wireless signal access control module mainly comprising a receiving antenna, a main control signal unit SU, a converged access unit AU, a remote unit RU, and a transmitting antenna connected in sequence, wherein:
the receiving antenna is configured to receive a base station signal in the air from a base station;
the main control signal unit SU is configured to obtain the base station signal through a coaxial port, and obtain a baseband control signal corresponding to a communication signal at a frequency band after the base station signal is processed, wherein the baseband control signal after being encoded is transmitted through a digital optical fiber to the converged access unit AU as a main control signal, and the digital optical fiber is an optical fiber configured to transmit a digital signal;
the converged access unit AU is configured to transmit the main control signal from the main control signal unit SU, a detecting signal from the detection module and a private network signal from the private network module to the remote unit RU through the digital optical fiber;
the remote unit RU is configured to generate an auxiliary control signal according to a signal intensity of signal in an access control area and base station information, mix the generated auxiliary control signal with the main control signal from the converged access unit AU according to an algorithm to generate a preliminary control signal, filter out a signal with a frequency corresponding to the detecting signal and a signal with a frequency corresponding to the private network signal from the preliminary control signal to generate a comprehensive control signal through pre-selection filtering, and finally combine the comprehensive control signal with the detecting signal and the private network signal to generate a comprehensive management signal;
the transmitting antenna is configured to transmit the comprehensive management signal from the remote unit RU to the air to control transmitting a signal from the base station to a mobile phone;
the detection module comprises at least one detecting base station configured to detect an unauthorized mobile phone;
the private network module comprises a private network base station configured to provide private network communication for authorized users;
the at least one detecting base station and the private network base station are configured to establish an uplink and downlink connection through the converged access unit AU, and the remote unit RU in the wireless signal access control module is also configured to serve as a forwarding relay for the detecting signal and the private network signal.

2. The digital optical fiber-based distributed signal control system of claim 1, wherein the main control signal is denoted by P, the auxiliary control signal is denoted by S, and the preliminary control signal is denoted by J, and P and S are mixed according to the algorithm to generate J, $J=\alpha \times P+(1-\alpha) \times S$, wherein $0<\alpha<1$, when $\alpha$ is greater than 1, $J=P$, wherein $\alpha$ is a ratio of a radius of a region actually covered by the remote unit RU to a distance between the remote unit RU and the main control signal unit SU.

3. The digital optical fiber-based distributed signal control system of claim 1, wherein the signals of the detection module, the signals of the private network module and the signals of the wireless signal access control module have different frequencies.

4. The digital optical fiber-based distributed signal control system of claim 1, wherein the number of the remote unit RU is one or more, and at least one remote unit RU is connected to the converged access unit AU through the digital optical fiber, each remote unit RU being connected to one or more transmitting antennas through a coaxial cable.

5. The digital optical fiber-based distributed signal control system of claim 4, wherein the distributed signal control system further comprises an extension unit EU connected to the converged access unit AU and the remote unit RU respectively through the digital optical fiber, and the extension unit EU is configured to transmit act as an extension access and increases the number of ports of the remote unit RU.

6. The digital optical fiber-based distributed signal control system of claim 1, wherein the converged access unit AU is connected to the private network base station and a plurality of detecting base stations, respectively, the number of detecting base stations being in line with the number of local mobile operators.

7. The digital optical fiber-based distributed signal control system of claim 1, wherein the distributed signal control system further comprises a positioning module configured to obtain a position information of a target mobile phone, and the positioning module is connected to the detection module and the converged access unit AU respectively; the positioning module is capable of detecting an intensity of an uplink signal of the target mobile phone by match filtering according to an uplink signal characteristic of the target mobile phone, wherein a location of the target mobile phone is determined by identifying the positioning module with the strongest signal strength among uplink signals.

8. The digital optical fiber-based distributed signal control system of claim 1, wherein the number of the digital optical fiber-based distributed signal control system is one or more, and the main control signal unit SU in each digital optical fiber-based distributed signal control system is further connected to a GPS antenna to obtain synchronous GPS clock information and use a second flip time of the GPS as a common clock to realize synchronization among a plurality of control systems.

* * * * *